US007097728B2

(12) United States Patent
Kissell et al.

(10) Patent No.: US 7,097,728 B2
(45) **Date of Patent: *Aug. 29, 2006**

(54) FRANGIBLE FIBERGLASS INSULATION BATTS

(75) Inventors: Carl J. Kissell, Shelbyville, IN (US); Cameron J. Wright, Naperville, IL (US); Jon W. Pereira, Shelbyville, IN (US)

(73) Assignee: Knauf Fiber Glass GmbH, Shelbyville, IN (US)

( * ) Notice: Subject to any disclaimer, the term of this patent is extended or adjusted under 35 U.S.C. 154(b) by 90 days.

This patent is subject to a terminal disclaimer.

(21) Appl. No.: 10/670,886

(22) Filed: Sep. 25, 2003

(65) Prior Publication Data

US 2005/0066785 A1 Mar. 31, 2005

(51) Int. Cl.
*B23B 37/00* (2006.01)
*E04B 1/62* (2006.01)

(52) U.S. Cl. ................ 156/252; 156/273.3; 156/275.5; 156/304.6; 156/512; 264/146; 264/152; 52/98; 52/309.3; 83/13; 428/58

(58) Field of Classification Search .................... 83/53, 83/177, 350, 355, 425, 425.2, 425.3, 678, 83/695, 22, 399, 400; 428/43, 54, 55, 74, 428/58; 52/98, 100, 309.3; 156/62.8, 259, 156/264, 268, 257, 270, 271, 512, 513, 546, 156/304.6, 307.1, 307.3, 252, 273.3, 275.5; 251/129.09; 28/167
See application file for complete search history.

(56) References Cited

U.S. PATENT DOCUMENTS

| | | | | |
|---|---|---|---|---|
| 1,238,356 | A | 8/1917 | Stokes | |
| 4,342,610 | A | 8/1982 | Ray, Jr. | |
| 4,693,153 | A * | 9/1987 | Wainwright et al. | 83/53 |
| 4,700,521 | A | 10/1987 | Cover | |
| 4,772,499 | A | 9/1988 | Greenway | |
| 5,083,487 | A * | 1/1992 | Croteau | 83/29 |
| 5,350,663 | A | 9/1994 | Blum et al. | |
| 5,765,318 | A | 6/1998 | Michelsen | |
| 5,931,178 | A * | 8/1999 | Pfarr et al. | 137/14 |
| 5,981,037 | A | 11/1999 | Patel et al. | |
| 6,083,594 | A | 7/2000 | Weinstein et al. | |
| 6,098,512 | A * | 8/2000 | Life et al. | 83/53 |
| 6,165,305 | A | 12/2000 | Weinstein et al. | |
| 6,327,948 | B1 * | 12/2001 | Tuori | 83/53 |
| 6,383,594 | B1 | 5/2002 | Weinstein et al. | |
| 6,399,694 | B1 | 6/2002 | McGrath et al. | |
| 6,484,463 | B1 | 11/2002 | Fay | |
| 6,670,011 | B1 * | 12/2003 | Weinstein et al. | 428/43 |
| 6,752,373 | B1 * | 6/2004 | Rudy et al. | 251/129.09 |
| 6,923,883 | B1 * | 8/2005 | Kissell et al. | 156/259 |

* cited by examiner

*Primary Examiner*—Kenneth E. Peterson
*Assistant Examiner*—Phong Nguyen
(74) *Attorney, Agent, or Firm*—Barnes & Thornburg LLP

(57) ABSTRACT

A frangible fiberglass insulation batt includes a frangible plane defined by a series of cuts in the batt.

20 Claims, 4 Drawing Sheets

FRANGIBLE FIBERGLASS INSULATION BATTS

BACKGROUND

The present disclosure relates to apparatus and methods for producing fiberglass insulation batts, and in particular batts of fiberglass insulation suitable for use in building construction. More particularly, the present disclosure relates to fiberglass insulation batts that are configured to be converted into separate fiberglass insulation strips of various predetermined widths in the field without the use of cutting tools.

A batt is a blanket of fiberglass insulation used to insulate residential and commercial buildings. Some batts include a paper or foil facing material affixed to the fiberglass insulation, and other batts do not include any facing material.

SUMMARY

According to the present disclosure, an interval cutter is used to establish a series of intermittent gaps in a fiberglass insulation blanket. The gaps cooperate to define a frangible plane in the fiberglass insulation blanket.

In an illustrative embodiment, the interval cutter includes a fluid discharger, a fluid-reservoir tray formed to include a fluid-discharge aperture, and a fluid blocker movable to one position to allow high-pressure fluid to pass through the fluid-discharge aperture and another position to block flow of high-pressure fluid through the fluid-discharge aperture. In an illustrative method, the fluid blocker is moved back and forth above the fluid-reservoir tray as a fiberglass insulation blanket is moved along a conveyor under the fluid-reservoir tray so that the high-pressure fluid is allowed to pass through the fluid-discharge aperture formed in the fluid-reservoir tray intermittently to intercept and penetrate the moving fiberglass insulation blanket to establish a series of intermittent gaps in the blanket, which gaps cooperate to define a frangible plane in the blanket.

Additional features of the present disclosure will become apparent to those skilled in the art upon consideration of the following detailed description of illustrative embodiments exemplifying the best mode of carrying out the disclosure as presently perceived.

BRIEF DESCRIPTION OF THE DRAWINGS

The detailed description particularly refers to the accompanying figures in which:

FIG. 8 shows that fluid discharged by the fluid-jet nozzle impacts a blocking surface provided on the movable fluid blocker upon arrival of the movable fluid blocker at an "intermediate" (first) position so that the fluid stream is blocked from passing through the fluid-discharge aperture formed in the fluid-reservoir tray;

FIGS. 9–11 show a fluid stream passing through a first fluid-discharge slot formed in the movable fluid blocker and then through the fluid-discharge aperture formed in the underlying fluid-reservoir tray to form a first gap in the moving fiberglass insulation blanket as the fluid blocker moves to the left (toward a second position) and then back to the right;

FIG. 12 shows the movable fluid blocker upon arrival back at the intermediate position shown in FIG. 9; and FIGS. 13–15 show a fluid stream passing through a second fluid-discharge slot formed in the movable fluid blocker and then through the fluid-discharge aperture formed in the underlying fluid-reservoir tray to form a second gap in the moving fiberglass insulation blanket as the fluid blocker continues to move to the right (toward a third position) and then back to the left.

DETAILED DESCRIPTION

Apparatus and methods are disclosed herein for producing a fiberglass insulation batt that is formed to include longitudinally extending frangible planes therein to enable construction workers to convert the fiberglass insulation batt into separate fiberglass insulation strips of various predetermined widths in the field without the use of cutting tools. A "batt" is a blanket of thermal insulation usually comprising glass fibers.

Figure 1:
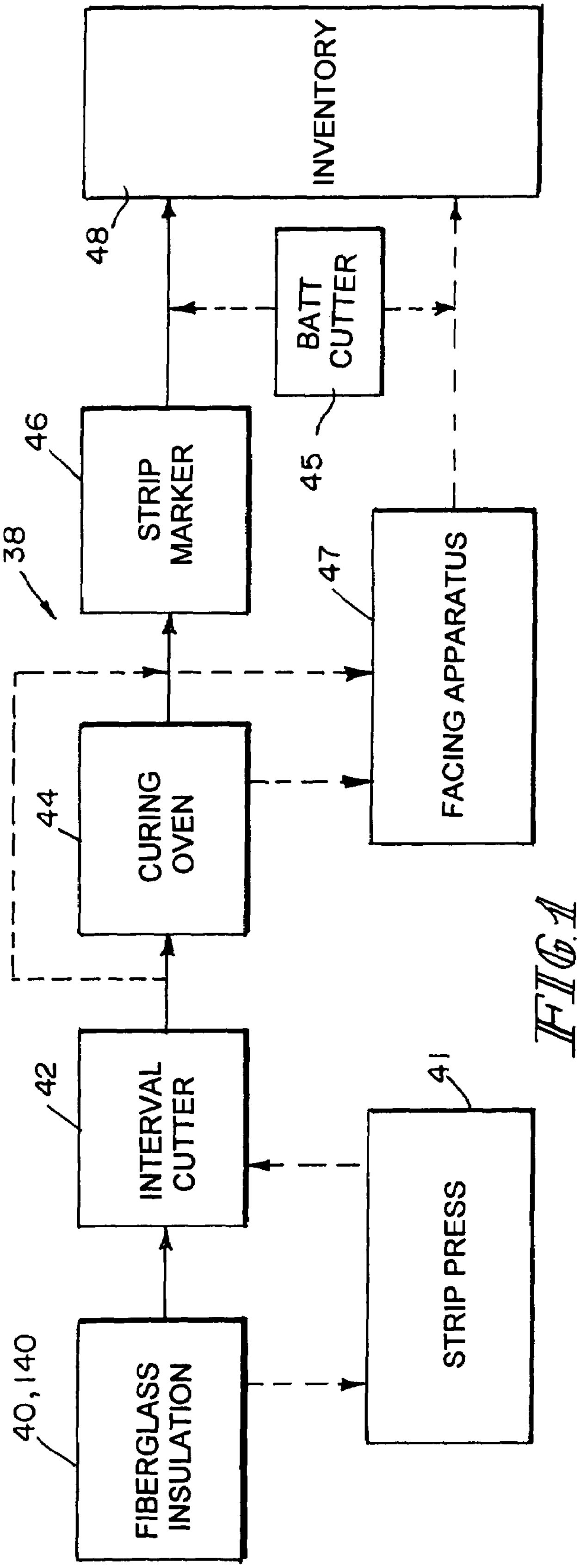
FIG. 1 is a diagrammatic view of methods in accordance with the present disclosure for producing a frangible fiberglass batt (that can be separated by hand into strips having predetermined widths)
Figure 2:
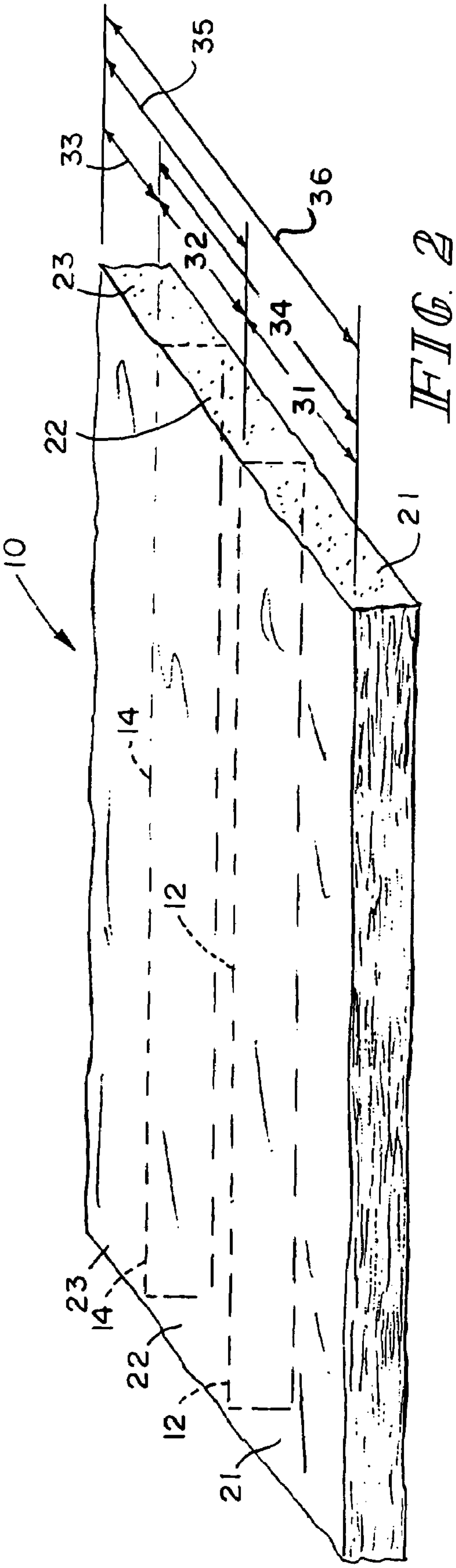
FIG. 2 is a perspective view of a frangible fiberglass insulation batt formed to include two frangible planes extending along the length of the batt so that the batt can be "broken" manually along the two frangible planes to produce three separate insulation strips without the use of cutting tools.

Various methods are suggested diagrammatically in FIG. 1 for producing a frangible fiberglass insulation batt 10 shown, for example, in FIG. 2. Batt 10 is formed using apparatus and methods disclosed herein to include, for example, two longitudinally extending frangible planes 12, 14 which are arranged to lie in spaced-apart parallel relation to one another to "partition" batt 10 into three formative longitudinally extending strips 21, 22, and 23. It is within the scope of this disclosure to form a batt to include any suitable number of frangible planes.

In the field at a construction site, a worker can separate first strip 21 from second strip 22 along first frangible plane 14 by pulling one strip laterally away from the other strip using a "peeling-away" action owing to a frangible configuration established along first frangible plane 12 between fiberglass material comprising first and second strips 21, 22. Likewise, a worker can separate third strip 23 from second strip 22 along second frangible plane 12 by pulling one of those strips away from the other of those strips in a similar manner owing to a frangible configuration established along second frangible plane 14 between fiberglass material comprising second and third strips 22, 23.

During building construction activities, workers often need to create insulation strips of non-conventional width and the ability to create a variety of strip widths without using cutting tools by use of frangible fiberglass insulation batt 10 would be welcomed by many workers in the construction trade. As suggested in FIG. 2, first strip 21 has a width 31, second strip 22 has a width 32, and third strip 23 has a width 33. Prior to separation, first and second strips 21, 22 have a combined width 34, second and third strips 22, 23 have a combined width 35, and first, second, and third strips 21, 22, and 23 have a combined width 36. By selecting the location of frangible planes 12, 14 carefully during manufacture, it is possible to create a unified but frangible fiberglass insulation batt that can be separated in the field to produce a wide variety of insulation strip widths without using cutting tools.

Apparatus 38 for producing frangible fiberglass insulation batt 10 using a cured fiberglass insulation blanket 40 or an uncured fiberglass insulation blanket 140 is shown diagrammatically in FIG. 1. Apparatus 38 includes an interval cutter 42 and may include a strip press 41, curing oven 44, batt cutter 45, strip marker 46, and facing apparatus 47. Apparatus 38 is used to establish one or more series of intermediate gaps 39 in fiberglass insulation blanket 40 or 140 as suggested, for example, in FIGS. 3 and 4 to define one or more frangible planes (e.g., 12, 14, 16) in blanket 40 or 140. Batts 10 produced by apparatus 38 are transported to inventory 48 or other destinations.

Figure 3:
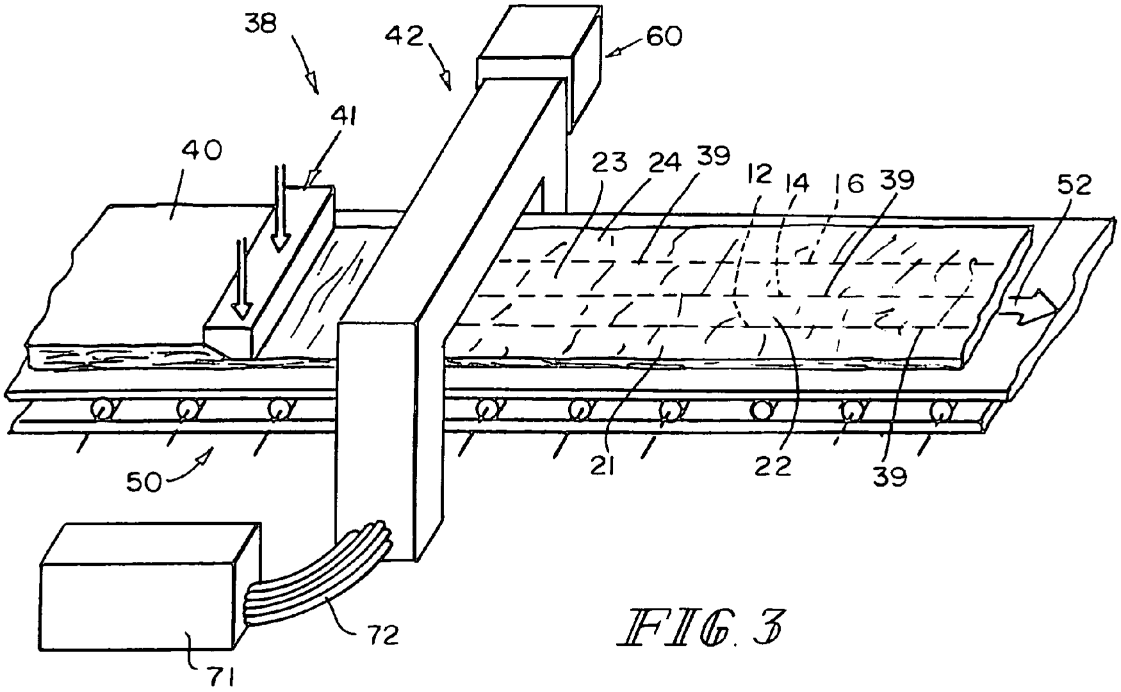
FIG. 3 is a perspective view of a first system for producing a fiberglass insulation batt, which system uses an interval cutter to form intermittent gaps in a moving blanket of fiberglass insulation to establish three frangible planes therein extending along the length of the fiberglass insulation blanket.
Figure 4:
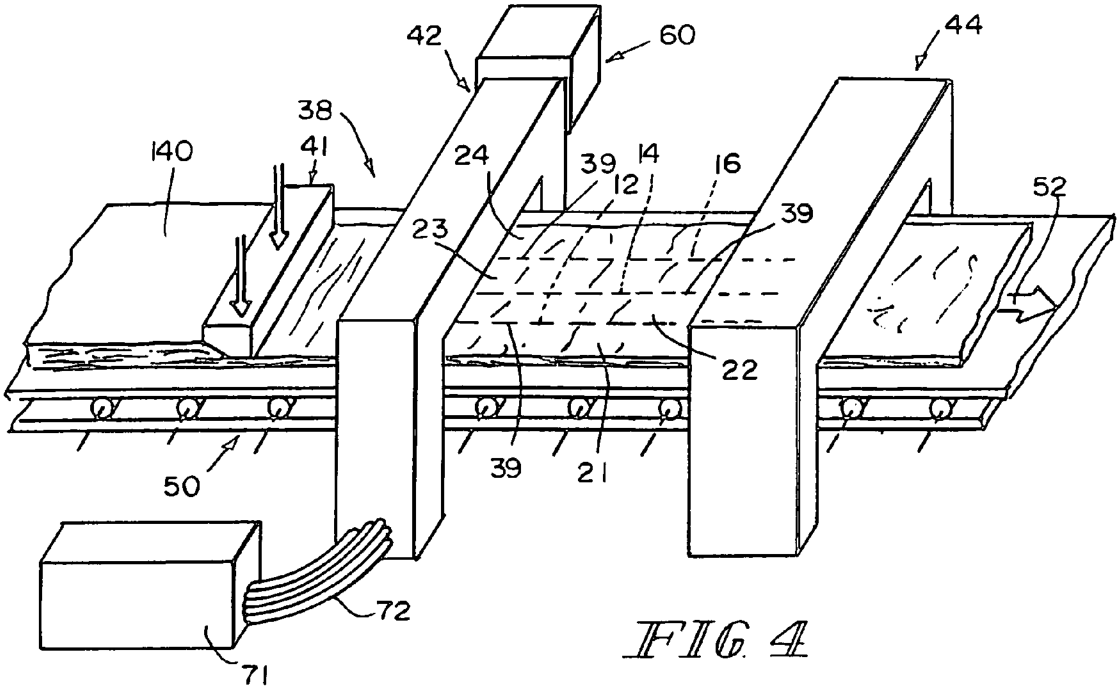
FIG. 4 is a perspective view of a second system for producing a fiberglass insulation batt, which system includes an interval cutter and a curing oven located in a "downstream" position relative to the interval cutter, the curing oven exposing the fiberglass insulation to heat to cause binder associated with opposing portions of the strips cooperating to form intermittent gaps therebetween to polymerize so that a frangible polymerized binder bridge spanning each gap is established along each longitudinally extending frangible plane.

As suggested in FIG. 3, fiberglass insulation blanket 40 is passed through interval cutter 42 to cut blanket 40 along a cut line 12 to form two side-by-side strips 21, 22 separated by a first series of intermittent gaps 39 to form a frangible plane 12 extending along cut line 12. In the illustrated embodiment, interval cutter 42 also cuts blanket 40 along cut lines 14 and 16 to provide (1) a second series of intermittent gaps 39 separating side-by-side strips 22, 23 to form a frangible plane 14 extending along cut line 14 and (2) a third series of intermittent gaps 39 separating side-by-side strips 23, 24 to form a frangible plane 16 extending along cut line 16.

Interval cutter 42 cuts all the way through fiberglass insulation blanket 40 to form each gap 39. Each gap 39 provides a break in the continuity of blanket 40. The gaps 39 cooperate to form, for example, frangible planes 12, 14, 16. Gaps 39 are shown, for example, in FIGS. 3, 4, 7, and 8–15.

Fiberglass insulation blanket 40 is transported along a conveyor 50 in a downstream conveyance direction 52 as suggested in FIG. 3. In the illustrated embodiment, each frangible plane 12, 14, 16 extends longitudinally in conveyance direction 52. In the illustrated embodiment, strip press 41 is used to compact fiberglass insulation blanket 40 to a compacted thickness before blanket 40 is passed through interval cutter 42.

Facing apparatus 47 is used (when desired) to apply a facing material (pre-marked with indicator lines) to one surface of fiberglass insulation blanket 40 to align the indicator lines with frangible planes 12, 14, 16 formed in blanket 40. A strip marker 46 can be used to mark frangible-plane indicator lines directly onto blanket 40.

As suggested in FIG. 1, a batt cutter 45 is provided downstream of strip marker 46 or facing apparatus 47. Batt cutter 45 is configured periodically to cut the strips 21, 22, 23, 24 laterally to provide a series of separate elongated frangible fiberglass insulation batts (not shown) for delivery to inventory 48.

Figure 5:
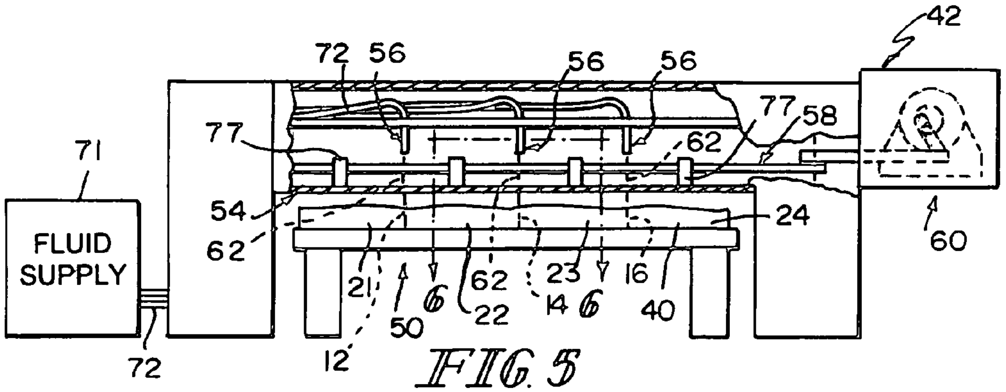
FIG. 5 is an end elevation view of the system shown in FIG. 3, with portions broken away, showing components included in the interval cutter including, for example, a fluid-jet nozzle positioned to lie above the moving fiberglass insulation blanket in registry with each of the formative frangible planes and discharge of a high-pressure fluid from the fluid-jet nozzles to establish intermittent gaps in the fiberglass insulation blanket and thereby form the longitudinally extending frangible planes.
Figure 6:
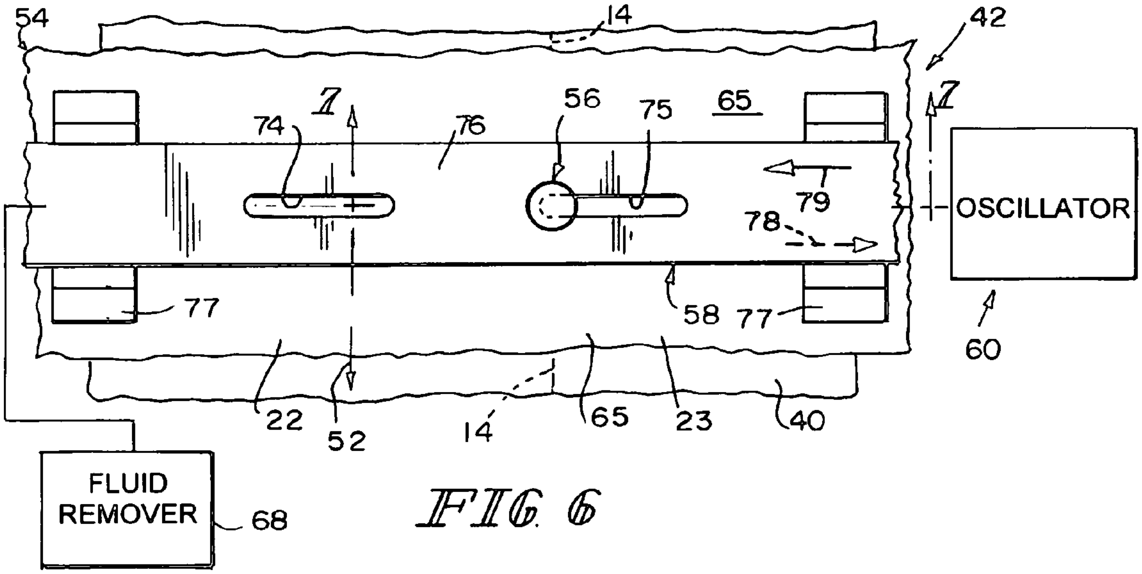
FIG. 6 is a sectional view taken along line 6—6 of FIG. 5 through one of the fluid-jet nozzles showing a movable fluid blocker formed to include two spaced-apart fluid-discharge slots (and a blocking surface located between the slots) and supported for back-and-forth movement (in left and right directions) above the moving fiberglass insulation blanket in response to forces generated by an oscillator located, for example, to the "right" of the fluid blocker.
Figure 7:
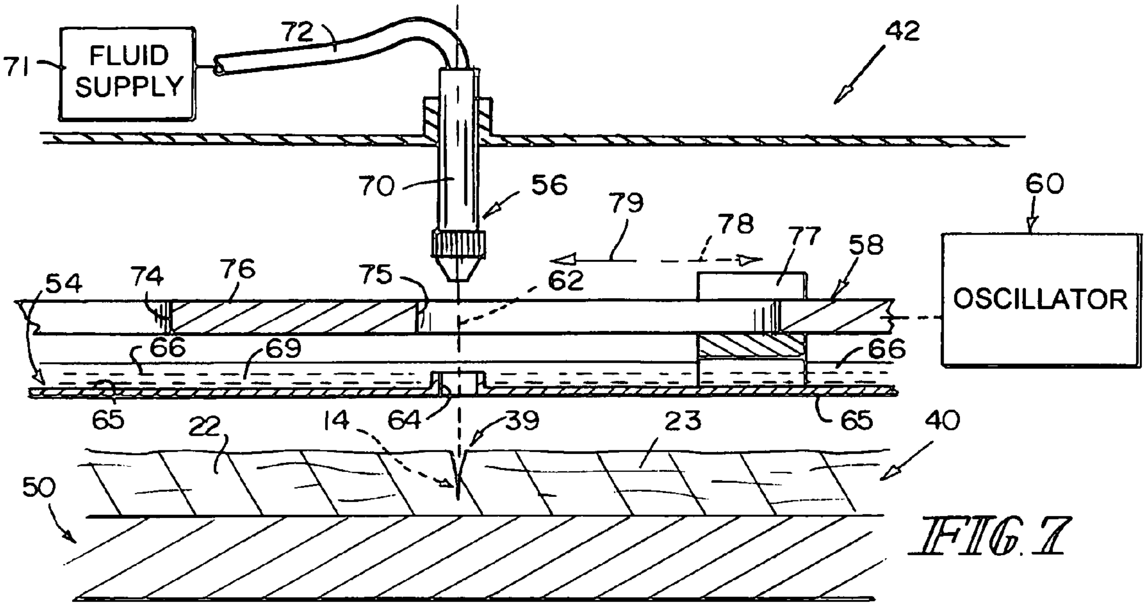
FIG. 7 is a sectional view taken along line 7—7 of FIG. 6 showing high-pressure liquid discharged from the fluid-jet nozzle to pass in a downward direction through one of the two fluid-discharge slots formed in the movable fluid blocker and then through a fluid-discharge aperture formed in a fluid-reservoir tray arranged to lie under the movable fluid blocker and above the moving fiberglass insulation blanket to allow the high-pressure fluid discharged from the fluid-jet nozzle to intercept and penetrate the moving fiberglass insulation blanket to form one of a series of intermittent gaps therein as the blanket moves along a conveyor under the movable fluid blocker and the fluid-reservoir tray.

One illustrative embodiment of interval cutter 42 is shown in FIGS. 5–7. A perspective view of that illustrative interval cutter 42 in use to form a series of intermittent gaps 39 in fiberglass insulation blanket 40 to produce frangible plane 14 is shown in FIGS. 8–15.

As suggested in FIGS. 5–8, interval cutter 42 includes a fluid-reservoir tray 54, a fluid discharger 56, a fluid blocker 58, and a blocker mover 60. In the illustrated embodiment, blocker mover 60 is an oscillator and operates to move fluid blocker 58 back and forth above fluid-reservoir tray 54 to cause high-pressure fluid 62 emitted from fluid discharger 56 to form a series of intermittent gaps 39 in the fiberglass insulation blanket 40 moving on conveyor 50 under interval cutter 42.

Fluid-reservoir tray 54 is supported in an elevated position above conveyor 50 and fiberglass insulation blanket 40 on conveyor 50. Tray 54 is formed to include a fluid-discharge aperture 64 opening toward conveyor 50 (and fiberglass insulation blanket 40 on conveyor 50). In the illustrated embodiment, tray 54 includes a floor 65 formed to include fluid-discharge aperture 64 and a pair of side walls 66 extending upwardly from side edges of floor 65 to define a fluid reservoir 67. It is within the scope of this disclosure to couple a fluid remover 68 to tray 54 to remove fluid 69 extant in fluid reservoir 67 so that accumulation of fluid 69 in fluid reservoir 67 is controlled in a suitable manner. It is also within the scope of this disclosure to configure tray 54 to conduct fluid 69 to a suitable destination without allowing any substantial amount of fluid 69 to accumulate in tray 54 during operation of interval cutter 42.

Fluid discharger 56 is configured to discharge high-pressure fluid 62 normally through fluid-discharge aperture 64 formed in tray 54 to intercept and penetrate fiberglass insulation blanket 40 supported on conveyor 50 to form a gap 39 in blanket 40 as suggested, for example, in FIG. 7. Fluid discharger 56 may deliver a continuous or pulsed stream of fluid 62. In the illustrated embodiment, fluid discharger 56 includes a fluid-jet nozzle 70 that is coupled to a fluid supply 71 by a hose 72. As suggested in FIG. 5, in an illustrated embodiment, three fluid dischargers 56 are coupled to fluid supply 71 by hoses 72 and are used to discharge three flows of high-pressure fluid 62 to intercept and penetrate fiberglass insulation blanket 40 along three spaced-apart lines to help establish the three frangible planes 12, 14, 16.

Figure 8:
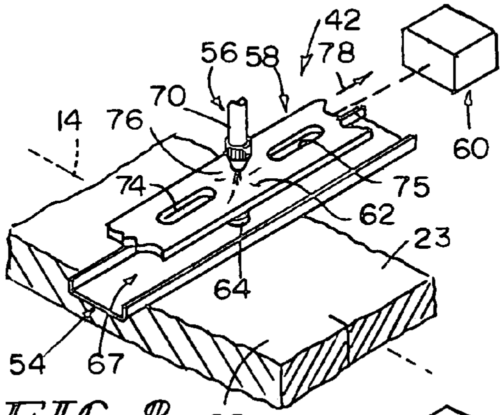
FIGS. 8–15 comprise a series of partial perspective "snapshot" views of the interval cutter of FIGS. 3 and 5–7 in operation to form a series of intermittent gaps in the fiberglass insulation blanket as the blanket moves under the oscillating movable fluid blocker and the fixed-position fluid-reservoir tray.
Figure 12:
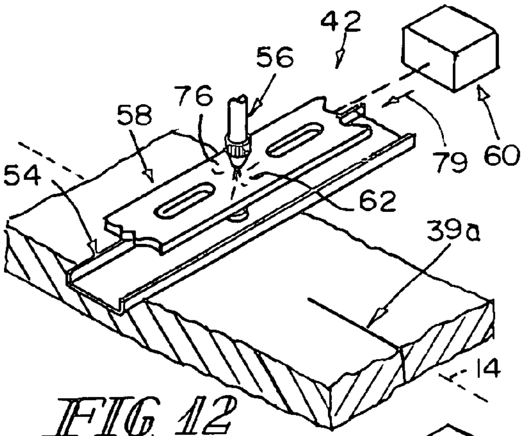
Figure 9:
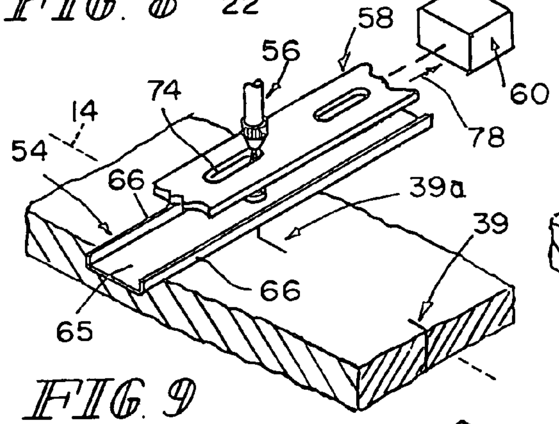
Figure 13:
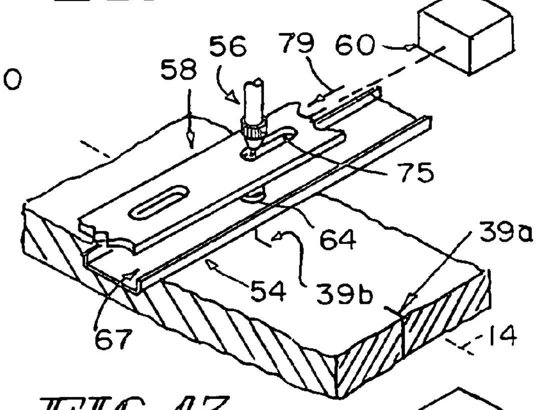

Fluid blocker 58 is positioned to lie between fluid discharger 56 and fluid-reservoir tray 54 as suggested, for example, in FIGS. 7 and 8. Fluid blocker 58 is formed to include a first fluid-discharge slot 74, a second fluid-discharge slot 75, and a blocking surface 76 located between slots 74 and 75. Fluid blocker 58 is mounted on, for example, supports 77 coupled to tray 54 for movement back and forth in first and second directions 78, 79 as suggested in FIG. 7 to regulate the flow of high-pressure liquid 62 through fluid-discharge aperture 64 toward fiberglass insulation blanket 40 as suggested in FIGS. 8–15. In the embodiment shown in FIG. 5, a pair of fluid-discharge slots and a blocking surface between those slots will be associated with each nozzle 70. It is within the scope of this disclosure to form each slot so that it can be used with a pair of adjacent nozzles 70.

Figure 10:
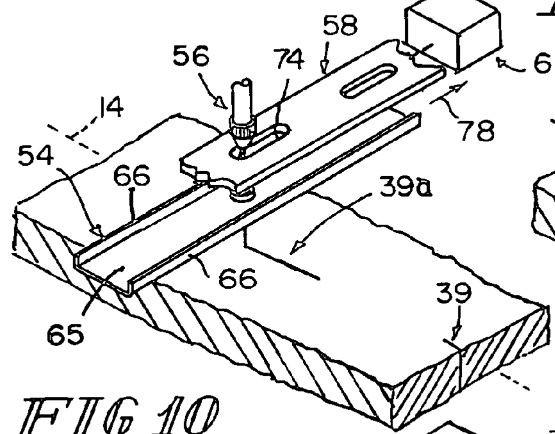
Figure 14:
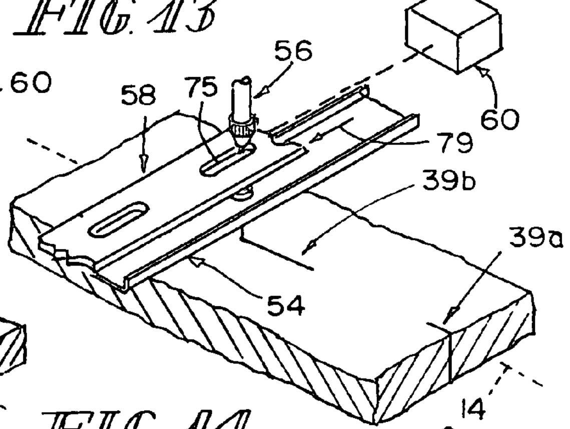

Blocker mover 60 is coupled to fluid blocker 58 and configured to move fluid blocker 58 between various positions relative to tray 54 and fluid discharger 56 during movement of fiberglass insulation blanket 40 on conveyor 50 in downstream conveyance direction 52 as suggested in FIGS. 8–15. In the illustrated embodiment, blocker mover 60 is an oscillator and is configured to move fluid blocker 58 in a first direction 78 and then in an opposite second direction 79 so that fluid blocker 58 moves or travels back and forth between two outer limit positions. In the illustrated embodiment, a first outer limit position is shown in FIG. 10 and a second outer limit position is shown in FIG. 14.

A frangible fiberglass insulation batt is produced using methods disclosed herein. According to one aspect of the disclosure, as suggested in FIGS. 3 and 4, fiberglass insulation blanket 40 (or 140) is moved in conveyance direction 52 and a first flow of high-pressure fluid is applied to the moving blanket 40 (or 140) intermittently to establish a first series of intermittent gaps 39 cooperating to define first frangible plane 12 in blanket 40 (or 140). Simultaneously, a second flow of high-pressure fluid is applied to blanket 40 (or 140) intermittently to establish a second series of intermittent gaps 39 cooperating to define second frangible plane 14 in blanket 40 (or 140). In the illustrated embodiment, a third flow of high-pressure fluid is applied to blanket 40 (or 140) intermittently to establish a third series of intermittent gaps 39 cooperating to define third frangible plane 16 in blanket 40 (or 140).

As suggested, for example, in FIG. 3, fiberglass insulation blanket 40 is passed through interval cutter 42 to cut fiberglass insulation blanket 40 along a cut line to form two side-by-side strips 22, 23 separated by a series of intermittent gaps 39 to form a frangible plane 14 extending along the cut line. Interval cutter 42 discharges a flow of high-pressure fluid 62 to intercept and penetrate fiberglass insulation blanket 40 along cut line 14 to form a gap 39 in fiberglass insulation blanket 40 as the blanket 40 is passed through interval cutter 42 and interrupting the flow of interval cutter 42 to divert the flow of high-pressure fluid from intercepting and penetrating blanket 40 intermittently to establish the series of intermittent gaps in the blanket 40. During formation of gaps 39, fiberglass insulation blanket 40 is moved by conveyor in a conveyance direction 52 relative to interval cutter 42.

Fluid blocker 58 is moved relative to blanket 40 to intercept the flow of high-pressure fluid 62 discharged toward blanket 40 to block the flow of high-pressure fluid 62 from intercepting fiberglass insulation blanket 40. Fluid blocker 58 is oscillated along a path relative to blanket 40 between (1) a first position (shown in FIGS. 8 and 12) placing a blocking surface 76 included in fluid blocker 58 in a location between a nozzle 70 discharging the flow of high-pressure fluid and blanket 40 to cause the flow of high-pressure fluid 62 to impinge upon the blocking surface 76 and (2) a second position (shown, e.g., in FIGS. 9–11) allowing the flow of high-pressure fluid 16 to pass through a slot 74 formed in fluid blocker 58 to intercept and penetrate fiberglass insulation blanket 40 to establish a first in the series of intermittent gaps 39. The path along which fluid blocker 58 oscillates is perpendicular to the conveyance direction 52 in which fiberglass insulation blanket 40 is moved.

Interval cutter 42 collects high-pressure fluid 69 after impingement of said high-pressure fluid 69 on blocking surface 76 of fluid blocker 58 in a reservoir 77 located in tray 54 above fiberglass insulation blanket 40. High-pressure fluid that has impinged upon blocking surface 76 may be conducted away from fiberglass insulation blanket 40.

Referring now to FIGS. 8–15, the act of interrupting the flow of high-pressure fluid 62 discharged toward fiberglass insulation blanket 40 to produce intermittent gaps 39 includes the following acts, in series. A "first" gap **39*a* is formed as suggested in FIGS. 8–12. A subsequent "second" gap 39*b* is formed as suggested in FIGS. 12–15**.

Figure 11:
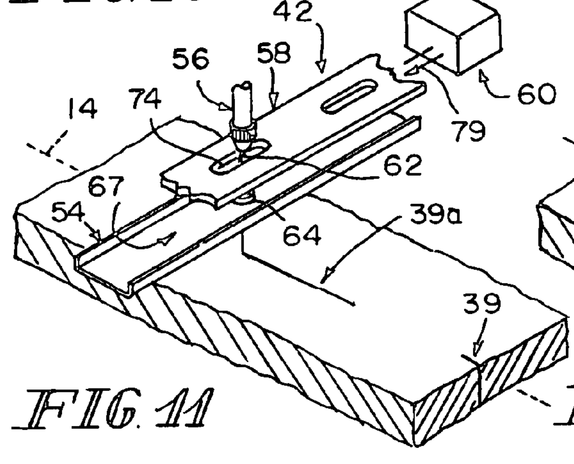

Fluid blocker 58 is located in a fluid-blocking position as shown in FIG. 8 to cause the flow of high-pressure fluid 62 discharged toward fiberglass insulation blanket 40 to impinge upon blocking surface 76 to block the flow of high-pressure fluid 62 from intercepting and penetrating fiberglass insulation blanket 40. Fluid blocker 58 is then urged to move in a first direction 78 from the position shown in FIG. 9 to a first outer limit position shown in FIG. 10 to allow the flow of high-pressure fluid 62 to flow through elongated first fluid-discharge slot 74 to form a leading section of a first (**39*a*) in the series of intermitting gaps 39. Fluid blocker 58 is then urged to move in an opposite second direction 79 from the first outer limit position shown in FIG. 10 toward the fluid-blocking position as shown in FIG. 11 to allow the flow of high-pressure fluid 62 to continue to flow through first fluid-discharge slot 74 to form a trailing section of the first (39*a*) in the series of intermittent gaps 39**.

Figure 15:
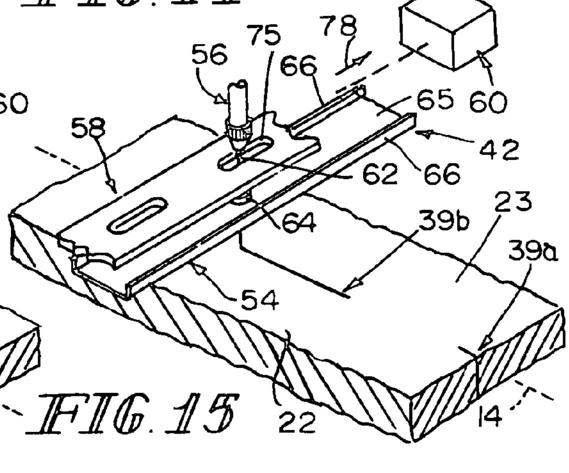

Fluid blocker 58 then continues to move in the opposite second direction 79 to the fluid-blocking position shown in FIG. 8 to cause the flow of high-pressure fluid 62 to impinge upon blocking surface 76 to block the flow of high-pressure fluid 62 from intercepting and penetrating fiberglass insulation blanket 40. Fluid blocker 58 continues to move in the opposite second direction 79 from the position shown in FIG. 13 to a second outer limit position shown in FIG. 14 to allow the flow of high-pressure fluid 62 to flow through elongated second fluid-discharge slot 75 to form a leading section of a second (**39*b*) in the series of intermittent gaps 39. Fluid blocker 58 is then urged to move in the first direction 79 from the second outer limit position shown in FIG. 14 toward the fluid-blocking position as shown in FIG. 15 to allow flow of high-pressure fluid 62 to continue to flow through the second fluid-discharge slot 75 to form a trailing section of the second (39*b***) in the series of intermittent gaps

39. Fluid blocker 58 then continues to move in the first direction 78 to the fluid-blocking position shown in FIG. 8 to cause the flow of high-pressure fluid 62 to impinge upon blocking surface 76 to block flow of high-pressure fluid 62 from intercepting and penetrating fiberglass insulation blanket 40.

Using another method illustrated diagrammatically in FIG. 1 and pictorially in FIG. 14, a blanket of uncured fiberglass insulation 140 is passed through an interval cutter 42 to cut the uncured fiberglass insulation 140 into two or more separate strips. These strips are then passed through a curing oven 44 to cause the binder associated with longitudinally extending side walls of adjacent strips along each gap 39 to polymerize to establish a frangible bridge spanning each gap between the opposing side walls of the adjacent strips during exposure to fiberglass curing heat (at a temperature of about 350° F. to 600° F.) to produce a batt 10 that appears to be monolithic and yet comprises at least one pair of adjacent insulation strips bonded to one another by relatively weak internal bonds along a frangible plane located therebetween. Before batt 10 is delivered to inventory 48, it is passed through a strip marker 46 that operates to apply one or more "indicator lines" to an exterior surface of batt 10 to mark the location of each longitudinally extending frangible plane in the batt 10.

Using another method illustrated diagrammatically in FIG. 1, uncured fiberglass insulation 140 is passed through a strip press 41 to compress uncured fiberglass insulation 140 to a compacted thickness before such uncured fiberglass insulation 140 is passed through internal cutter 42. Using another method illustrated diagrammatically in FIG. 1, a facing apparatus 47 is used to apply a facing material (pre-marked with indicator lines) to one surface of the now-cured fiberglass insulation to align the indicator lines with the frangible planes formed in the cured fiberglass insulation.

Uncured fiberglass insulation comprises glass fibers coated with a binder. The binder "sets" when exposed to high temperature in a curing oven to bind the glass fibers together. Using the apparatus and method of the present disclosure, separated side-by-side strips of uncured fiberglass insulation are passed through a curing oven to cause the binder to polymerize across a small gap between the side-by-side strips to establish a "bridge" of polymerized binder (containing only an insubstantial amount of glass fibers) spanning that small gap and coupling the side-by-side strips together. Because the polymerized binder bridge contains only an insubstantial amount of glass fibers, it is readily or easily broken (i.e., frangible) in response to manual "tearing" or "peeling" forces applied by a construction worker in the field so that the worker can separate one strip from its side-by-side companion strip manually without the use of cutting tools.

The invention claimed is:

1. A method of producing a frangible fiberglass insulation batt, the method comprising the acts of moving an uncured fiberglass insulation blanket having a binder extant in the fiberglass insulation blanket in a conveyance direction and applying a first flow of high-pressure fluid to the moving fiberglass insulation blanket intermittently to establish a first series of intermittent gaps cooperating to define a first frangible plane in the fiberglass insulation blanket, and moving the fiberglass insulation blanket through a curing oven after the applying act to expose the fiberglass insulation blanket to a predetermined fiberglass curing heat extant in the curing oven to cause binder extant in the fiberglass insulation blanket to polymerize to establish a frangible bridge spanning each of the first series of intermittent gaps.

2. A method of producing a frangible fiberglass insulation batt, the method comprising the acts of passing a fiberglass insulation blanket through an interval cutter to cut the fiberglass insulation blanket along a cut line to form two side-by-side strips separated by a series of intermittent gaps to form a frangible plane extending along the cut line, wherein the act of passing comprises the acts of discharging a flow of high-pressure fluid to intercept and penetrate the fiberglass insulation blanket along the cut line to form a gap in the fiberglass insulation blanket as the fiberglass insulation blanket is passed through the interval cutter and interrupting the flow of high-pressure fluid intermittently as the fiberglass insulation blanket is passed through the interval cutter to divert the flow of high-pressure fluid from intercepting and penetrating the fiberglass insulation blank intermittently to establish the series of intermittent gaps in the fiberglass insulation blanket, and further comprising the act of then passing the two side-by-side strips through a curing oven to expose the strips to a predetermined fiberglass curing heat extant in the curing oven to cause binder extant in the fiberglass insulation blanket to polymerize to establish a frangible bridge spanning each of the series of intermittent gaps in the fiberglass insulation blanket.

3. A method of producing a frangible fiberglass insulation batt, the method comprising the acts of moving a fiberglass insulation blanket in a conveyance direction, providing a fluid-reservoir tray supported in an elevated position above the conveyor and formed to include a fluid-discharge aperture opening toward the conveyor, aiming a flow of high-pressure fluid discharged from a fluid discharger to pass through the fluid-discharge opening formed in the fluid-reservoir tray and toward the fiberglass insulation blanket, and oscillating a fluid blocker for movement in a space located between the fluid discharger and the fluid-reservoir tray relative to the flow of high-pressure fluid through a movement cycle comprising, in series, a first position interrupting the flow of high-pressure fluid, a second position allowing the flow of high-pressure fluid to intercept and penetrate the moving fiberglass insulation blanket to establish a first gap in a series of intermittent gaps, the first position, and a third position allowing the flow of high-pressure fluid to intercept and penetrate the moving fiberglass insulation blanket to establish a second gap in the series of intermittent gaps.

4. The method of claim 3, wherein the oscillating act includes the act of repeating the movement cycle to establish additional gaps in the series of intermittent gaps to define a frangible plane extending along the fiberglass insulation blanket.

5. A method of producing a frangible fiberglass insulation batt, the method comprising the acts of providing a fluid-reservoir tray formed to include a fluid-discharge aperture opening toward a conveyor passing a fiberglass insulation blanket through an interval cutter to cut the fiberglass insulation blanket along a cut line to form two side-by-side strips separated by a series of intermittent gaps to form a frangible plane extending along the cut line, wherein the act of passing comprises the acts of discharging a flow of high-pressure fluid to intercept and penetrate the fiberglass insulation blanket along the cut line to form a gap in the fiberglass insulation blanket as the fiberglass insulation blanket is passed through the interval cutter and interrupting the flow of high-pressure fluid intermittently as the fiberglass insulation blanket is passed through the interval cutter to divert the flow of high-pressure fluid from intercepting and penetrating the fiberglass insulation blank intermittently to establish the series of intermittent gaps in the fiberglass insulation blanket and cause the diverted flow of high-pressure fluid to pass into a fluid-reservoir tray located above the insulation blanket to block the flow of high-pressure fluid.

6. The method of claim 5, wherein the act of passing includes the act of moving the fiberglass insulation blanket in a conveyance direction relative to the interval cutter and the act of interrupting includes the acts of moving a fluid blocker comprising a plate located above the fluid-reservoir tray and formed to include a first fluid-discharge slot associated with a first gap formed in the insulation fiberglass blanket and a second fluid-discharge slot associated with a second gap formed in the fiberglass insulation blanket relative to the fiberglass insulation blanket to intercept the flow of high-pressure fluid discharged toward the fiberglass insulation blanket to block the flow of high-pressure fluid from intercepting the fiberglass insulation blanket.

7. A method of producing a frangible fiberglass insulation batt, the method comprising the acts of passing a fiberglass insulation blanket through an interval cutter to cut the fiberglass insulation blanket along a cut line to form two side-by-side strips separated by a series of intermittent gaps to form a frangible plane extending along the cut line, wherein the act of passing comprises the acts of discharging a flow of high-pressure fluid to intercept and penetrate the fiberglass insulation blanket along the cut line to form a gap in the fiberglass insulation blanket as the fiberglass insulation blanket is passed through the interval cutter, interrupting the flow of high-pressure fluid intermittently as the fiberglass insulation blanket is passed through the interval cutter to divert the flow of high-pressure fluid from intercepting and penetrating the fiberglass insulation blank intermittently to establish the series of intermittent gaps in the fiberglass insulation blanket, and moving the fiberglass insulation blanket in a conveyance direction relative to the interval cutter, and wherein the act of interrupting includes the acts of moving a fluid blocker relative to the fiberglass insulation blanket to intercept the flow of high-pressure fluid discharged toward the fiberglass insulation blanket to block the flow of high-pressure fluid from intercepting the fiberglass insulation blanket and oscillating the fluid blocker along a path relative to the fiberglass insulation blanket between a first position placing a blocking surface included in the fluid blocker in a location between an outlet discharging the flow of high-pressure fluid and the fiberglass insulation blanket to cause the flow of high-pressure fluid to impinge upon the blocking surface and a second position allowing the flow of high-pressure fluid to pass through a slot formed in the fluid blocker to intercept and penetrate the fiberglass insulation blanket to establish a first in the series of intermittent gaps.

8. The method of claim 7, wherein the path along which the fluid blocker oscillates is perpendicular to the conveyance direction in which the fiberglass insulation blanket is moved.

9. The method of claim 7, wherein the act of interrupting further includes the act of collecting high-pressure fluid after impingement of said high-pressure fluid on the blocking surface of the fluid blocker in a reservoir located above the fiberglass insulation blanket.

10. The method of claim 7, wherein the act of interrupting further includes the act of conducting high-pressure fluid that has impinged upon the blocking surface away from the fiberglass insulation blanket.

11. A method of producing a frangible fiberglass insulation batt, the method comprising the acts of passing a fiberglass insulation blanket through an interval cutter to cut the fiberglass insulation blanket along a cut line to form two side-by-side strips separated by a series of intermittent gaps to form a frangible plane extending along the cut line, wherein the act of passing comprises the acts of discharging a flow of high-pressure fluid to intercept and penetrate the fiberglass insulation blanket along the cut line to form a gap in the fiberglass insulation blanket as the fiberglass insulation blanket is passed through the interval cutter and interrupting the flow of high-pressure fluid intermittently as the fiberglass insulation blanket is passed through the interval cutter to divert the flow of high-pressure fluid from intercepting and penetrating the fiberglass insulation blank intermittently to establish the series of intermittent gaps in the fiberglass insulation blanket, wherein the act of interrupting includes the acts of, in series, locating a fluid blocker formed to include elongated first and second fluid-discharge slots and a blocking surface located between the elongated first and second fluid-discharge slots in a fluid-blocking position to cause the flow of high-pressure fluid discharged toward the fiberglass insulation blanket to impinge upon the blocking surface to block the flow of high-pressure fluid from intercepting and penetrating the fiberglass insulation blanket, urging the fluid blocker to move in a first direction from the fluid-blocking position to a first outer limit position to allow the flow of high-pressure fluid to flow through the elongated first fluid-discharge slot to form a leading section of a first in the series of intermittent gaps, urging the fluid blocker to move in an opposite second direction from the first outer limit position toward the fluid-blocking position to allow the flow of high-pressure fluid to continue to flow through the first fluid-discharge slot to form a trailing section of the first in the series of intermittent gaps, urging the fluid blocker to continue to move in the opposite second direction to the fluid-blocking position to cause the flow of high-pressure fluid to impinge upon the blocking surface to block the flow of high-pressure fluid from intercepting and penetrating the fiberglass insulation blanket, urging the fluid blocker to continue to move in the opposite second direction from the fluid-blocking position to a second outer limit position to allow the flow of high-pressure fluid to flow through the elongated second fluid-discharge slot to form a leading section of a second in the series of intermittent gaps, urging the fluid blocker to move in the first direction from the second outer limit position toward the fluid-blocking position to allow flow of high-pressure fluid to continue to flow through the second fluid-discharge slot to form a trailing section of the second in the series of intermittent gaps, and urging the blocker to continue to move in the first direction to the fluid-blocking position to cause the flow of high-pressure fluid to impinge upon the blocking surface to block the flow of high-pressure fluid from intercepting and penetrating the fiberglass insulation blanket.

12. The method of claim 11, wherein each of the first direction and the opposite second direction is perpendicular to the conveyance direction.

13. The method of claim 11, wherein the act of interrupting further includes the act of interrupting further includes the act of collecting high-pressure fluid after impingement of said high-pressure fluid on the blocking surface of the fluid blocker in a reservoir located above the fiberglass insulation blanket.

14. The method of claim 11, wherein the act of interrupting further includes the act of interrupting further includes the act of conducting high-pressure fluid that has impinged upon the blocking surface away from the fiberglass insulation blanket.

15. A method of producing a frangible fiberglass insulation batt, the method comprising the acts of passing a fiberglass insulation blanket through an interval cutter to cut the fiberglass insulation blanket along a cut line to form two side-by-side strips separated by a series of intermittent gaps to form a frangible plane extending along the cut line, wherein the act of passing comprises the acts of discharging a flow of high-pressure fluid to intercept and penetrate the fiberglass insulation blanket along the cut line to form a gap in the fiberglass insulation blanket as the fiberglass insulation blanket is passed through the interval cutter, interrupting the flow of high-pressure fluid intermittently as the fiberglass insulation blanket is passed through the interval cutter to divert the flow of high-pressure fluid from intercepting and penetrating the fiberglass insulation blank intermittently to establish the series of intermittent gaps in the fiberglass insulation blanket, and moving the fiberglass insulation blanket in a conveyance direction relative to the interval cutter, and wherein the act of interrupting includes the acts of moving a fluid blocker relative to the fiberglass insulation blanket to intercept the flow of high-pressure fluid discharged toward the fiberglass insulation blanket to block the flow of high-pressure fluid from intercepting the fiberglass insulation blanket and oscillating the fluid blocker along a path relative to the fiberglass insulation blanket between a first position placing a blocking surface included in the fluid blocker between an outlet discharging the flow of high-pressure fluid and the fiberglass insulation blanket to cause the flow of high-pressure fluid to impinge upon the blocking surface, a second position allowing the flow of high-pressure fluid to pass through a first fluid-discharge slot formed in the fluid blocker to intercept and penetrate the fiberglass insulation blanket to establish a first in the series of intermittent gaps, and a third position allowing the flow of high-pressure fluid to pass through a second fluid-discharge slot formed in the fluid blocker to intercept and penetrate the fiberglass insulation blanket to establish a second in the series of intermittent gaps.

16. The method of claim 15, wherein the fluid blocker is configured to locate the blocking surface between the first and second fluid-discharge slots.

17. The method of claim 15, wherein the act of oscillating includes the acts of, in series, urging the fluid blocker to move in a first direction from the first position to the second position, urging the fluid blocker to move in an opposite second direction from the second position to the first position and then to the third position, and urging the fluid blocker to move in the first direction from the third position to the first position.

18. The method of claim 15, wherein the path along which the fluid blocker oscillates is perpendicular to the conveyance direction in which the fiberglass insulation blanket is moved.

19. The method of claim 15, wherein the act of interrupting further includes the act of collecting high-pressure fluid after impingement of said high-pressure fluid on the blocking surface of the fluid blocker in a reservoir located above the fiberglass insulation blanket.

20. The method of claim 15, wherein the act of interrupting further includes the act of conducting high-pressure fluid that has impinged upon the blocking surface away from the fiberglass insulation blanket.

* * * * *